United States Patent Office 3,047,398
Patented July 31, 1962

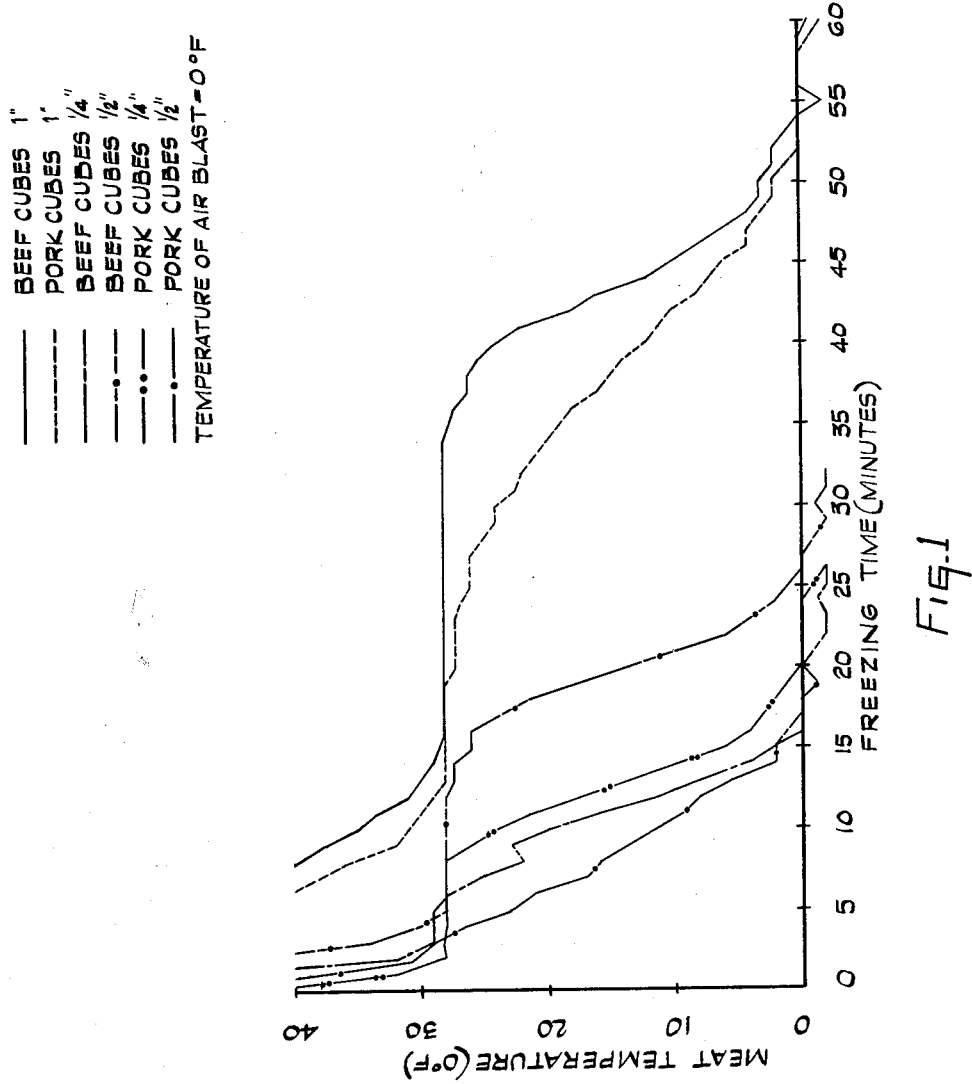

3,047,398
PREPARATION OF COMMINUTED MEAT PRODUCTS
Desmond B. Watt, La Grange, Ill., assignor to Swift & Company, Chicago, Ill., a corporation of Illinois
Filed Oct. 14, 1959, Ser. No. 846,348
4 Claims. (Cl. 99—109)

The present invention relates to sausage manufacture and, more specifically, to an improvement in the method for processing meat trimmings in the preparation of sausage and other ground meat products.

Meat utilized in sausage manufacturing consists for the most part of the trimmings or scraps obtained from various carcass dressing operations. These trimmings have a sticky and semi-plastic consistency which makes them difficult to handle with modern transfer and processing equipment. Therefore, several of the handling and formulating steps encountered in sausage manufacturing have been traditionally carried out manually. This need for manual manipulation of the meat trimmings prevents fully automatic processing operations and generally adds to the final cost of the end product.

Aside from being difficult to handle, meat trimmings as removed from the carcass during cutting operations are a relatively delicate and perishable substance, and it is well known that utmost care must be taken to prevent the development and growth of undesirable bacteria in the meat.

Meat trimmings also vary in kind and quality. Thus, in order to achieve an accurately formulated product, the trimmings should be classified according to fat, moisture, and protein content, as well as the species of animal from which it originates. The complex and heterogeneous composition of meat trimmings as obtained from cutting operations tends to make accurate sampling difficult.

It is, therefore, an object of this invention to provide a method for converting meat trimmings into a form which lends itself to processing by automatic equipment.

It is still another object of this invention to provide a method for processing the meat utilized in sausage manufacture into a relatively stable and nonperishable form.

It is still a further object of this invention to provide a method for treating meat used in sausage manufacture in a manner which renders the substance homogeneous and adaptable to accurate sampling.

It is yet another object of this invention to provide a method for processing meat into a form which may be subsequently processed into sausage without undergoing undue deterioration.

It is yet a further object of this invention to provide a method for processing meat trimmings into a durable form which may be conveniently stored and accurately inventoried at the site of storage.

Various other objects of the invention will become apparent to those skilled in the art from the following detailed description.

Generally, the invention contemplates the freezing of individual particles of meat into a noncohesive form that may conveniently be handled and stored in modern automatic processing and storing equipment.

More specifically, the preferred method of practicing the present invention involves reducing pieces of meat to a uniform particle size, freezing the comminuted meat into discrete particles, and storing the discretely frozen particles at below freezing temperatures until use. The first step of the method comprises the comminuting of the meat trimmings into cube-like particles having a dimension of from about ¼" to about 1". This may be done by passing the meat through a conventional dicing machine having a cutter mechanism of appropriate size. This comminuting step is performed on meat trimmings which are held at a temperature of from about 26° F. to about 28° F. At these temperatures the meat is sufficiently firm to be cut into discrete particles but not too hard to be comminuted with conventional dicing equipment.

After the meat has been comminuted to the desired size, it is placed or passed through a quick freezing chamber, which is maintained at a temperature of from about −40° F. to about 0° F. It is desirable to separate the meat particles from each other as they are being subjected to the quick freezing temperature for a period of time sufficient to solidly freeze each discrete particle; at such time the temperature of the meat is lowered to about 0° F. The temperature of the meat may be brought down below 0° F. but is not necessary for the practice of this invention. The exact time required to adequately freeze the product depends on the particle size and initial temperature of the meat, as well as the structure and temperature of the quick freezing apparatus. The freezing apparatus used is preferably of the continuous conveyor type, in which the meat particles are discretely placed on a conveyor mechanism which passes through a cold chamber; however, it may be of the plate type in which batches of individual meat particles are placed between freezer plates and discretely frozen.

The graph shown as FIG. 1 on which freezing time versus meat temperature is plotted illustrates the relationship which exists between the many variables involved in the quick freezing step. It is seen that the time required to freeze meat particles is dependent upon the freezing temperature, the particle size, as well as the kind of meat processed. Generally, for a given freezing temperature, the time required to satisfactorily freeze meat trimmings used in sausage manufacture decreases with a decrease in particle size, and decreases with an increased fat content. It is obvious that the freezing time will decrease with a corresponding decrease in blast or plate freezing temperature. The data was accumulated using a conventional blast freezer of the type commonly used in the food processing industry with the temperature of the blast being maintained at about 0° F. It should be remembered that the numerical relationships expressed are merely representative for a given apparatus and that many variations may be obtained by changing the mechanical configuration of the freezing apparatus utilized. It should also be remembered that the data presented herein represents data accumulated from specific tests and that some apparent minor inconsistencies appearing therein may be expected. Such variations and inconsistencies are inherent in the data accumulating procedures used and should not be considered to controvert the validity of the generalizations drawn from such data.

After the meat particles are frozen, they may be immediately utilized or conveyed to storage. In either case they should be maintained at a temperature of 20° F. or lower in order to prevent the particles from fusing together due to the variable pressure of the product. Temperatures in the range around 0° F. are preferred. In the case of cured meat particles, the temperature must be adjusted because of the variable electrolyte content of the meat.

It has been found that meat trimmings which have been processed in accordance with the above given method will remain particulate and wholesome almost indefinitely if maintained at suitable storage temperatures. This enables the large sausage manufacturer to maintain stocks of various types of meat trimmings, for example, lamb, beef, veal and pork, etc., in convenient gravity and/or auger feed containers, which may be drawn upon at will to fulfill a variety of formulation requirements. Various types or grades of frozen particulate meat trimmings may be conveyed from their respective containers and continuously weighed and apportioned by means of modern automatic formulation machinery, such as is currently being used in a variety of industries which handle or formulate a particulate product. It is obvious that such apparatus may not ordinarily be used to handle a flaccid, semi-plastic substance such as nonfrozen or nonparticulate meat trimmings.

Meat trimmings which have been processed in accordance with the present invention may be accurately analyzed for fat, protein, and moisture content. This is due to the fact that the comminution and subsequent remixing of the particulate product makes a generally more homogeneous substance from which truly representative samples may be taken and tested. The following specific examples represent embodiments of the invention.

*Example I*

Fifty pounds of beef trimmings maintained at a temperature of 26–28° F. were passed through a meat dicer having a ½" cutter plate. The resulting comminuted product was spread thinly and substantially discretely on a conveyor belt which passed through a blast freezing chamber maintained at a conventional blast freezing temperature of −40° F. The speed of the conveyor was regulated so that each meat particle was subjected to the low temperature for 30 minutes. During this time the temperature of the meat fell to about 0° F. The resulting product was then stored in a refrigerated compartment maintained at 0° F. to −10° F.

*Examples II–IV*

Fifty pound portions of pork, lamb, and veal trimmings were subjected to the same process set forth in Example I except for the blast freezing step, during which the speed of the conveyor was regulated so that the particles of each type of meat spent 15, 30, and 30 minutes respectively in the blast freezing chamber.

*Example V*

Twenty-five pounds of beef trimmings maintained at a temperature of 26–28° F. were passed through a meat dicing machine having a ¼" cutter plate. The comminuted product was spread thinly and substantially discreately on a conveyor belt which passed through a blast freezing chamber maintained at a temperature of −40° F. The speed of the conveyor was regulated so that each meat particle was subjected to the low temperature for 15 minutes. The resulting product was then stored in a refrigerated compartment maintained at 0° to −10° F.

*Example VI*

Twenty-five pounds of beef trimmings maintained at a temperature of 26–28° F. were passed through a meat dicing machine having a 1" cutter plate. The comminuted product was spread thinly and substantially discretely on a conveyor belt which passed through a blast freezing chamber maintained at a temperature of −40° F. The speed of the conveyor was regulated so that each meat particle was subjected to the low temperature for 55 minutes. The resulting product was then stored in a refrigerated compartment maintained at 0° to −10° F.

*Example VII*

A ten pound portion of beef trimmings was diced into ½" cubes while being maintained at a temperature of 26–28° F. The cubes were placed between freezing plates which were maintained at a temperature of −40° F. The hard frozen product was removed after 30 minutes and stored at a temperature of 0° F. to −10° F.

The meat trimmings processed in the above manner remained in storage for two months without undergoing any substantial decomposition and without becoming clumped. During the entire storage period, the product remained free flowing and could be easily withdrawn from the bottom of a gravity feed storage hopper having a 6" opening.

The meat trimmings processed in the above manner may be combined in various portions with spices and water and chopped in a suitable cutter apparatus to form domestic sausage emulsions, and dry sausage mixes.

Obviously, many modifications and variations of the invention as hereinbefore set forth may be made without departing from the spirit and scope thereof, and therefore only such limitations should be imposed as are indicated in the appended claims.

I claim:

1. The improvement in the method of preparing meat trimmings of various types of meat for use in sausage manufacturing, which comprises comminuting the meat trimmings to form substantially uniform particles, freezing said particles while maintaining them in a substantially segregated condition, classifying each type of separate meat trimmings in accordance with origin and composition, separately storing each type of said classified particles at a temperature below about 0° F., and combining quantities of said classified particles to obtain specific formulations thereof.

2. The improvement in the method of handling meat trimmings in the formulation of comminuted meat products, which comprises comminuting meat trimmings to form substantially uniform particles, freezing said particles while maintaining them in a substantially segregated condition, classifying batches of said particles in accordance to their composition, separately storing the batches of classified particles at a temperature below about 20° F. to prevent the discretely frozen particles from freezing together, and combining required proportions of said batches of classified particles to form given formulations thereof.

3. The improvement in the method of formulating a comminuted meat product of uniform composition form batches of meat trimmings having various compositions, which comprises comminuting meat trimmings maintained at a temperature of from about 26° F. to about 28° F. to form meat particles having a substantially uniform size of from about ¼ to 1", subjecting the particles to a freezing temperature of about 0° F. to about −40° F., until substantially frozen while maintaining said particles substantially separate from each other, classifying the batches of said particles in accordance to their composition, separately storing the batches of classified particles at a temperature of below about 0° F., to prevent the discretely frozen particles from fusing together, and combining required proportions of said batches of classified particles to form given formulations thereof.

4. The improvement in the method of handling meat trimmings for use in sausage manufacture, which comprises comminuting the meat trimmings to form substantially uniform particles, subjecting said particles to a quick freezing temperature until each particle reaches a temperature of about 0° F., while maintaining said particles substantially separate from each other to form a particulate free flowing product, classifying batches of said particular product in accordance to their compositions, separately storing said batches of product at a temperature below about 20° F. whereby said product remains particulate and free flowing, and combining desired proportions of said batches of particulate product from time to time to form a given comminuted meat composition.

References Cited in the file of this patent

UNITED STATES PATENTS

| | | |
|---|---|---|
| 2,182,556 | Griswold | Dec. 5, 1939 |
| 2,221,220 | Pack | Nov. 12, 1940 |
| 2,284,270 | Eberts et al. | May 26, 1942 |
| 2,504,869 | Noyes | Apr. 18, 1950 |
| 2,521,579 | Hopkins et al. | Sept. 5, 1950 |
| 2,521,849 | Hopkins et al. | Sept. 12, 1950 |